US005988220A

United States Patent [19]
Sakaki

[11] Patent Number: 5,988,220
[45] Date of Patent: Nov. 23, 1999

[54] THREE-WAY BALL VALVE

[75] Inventor: Kazuhiro Sakaki, Nobeoka, Japan

[73] Assignee: Asahi Organic Chemicals Industry Co., Ltd., Nobeoka, Japan

[21] Appl. No.: 09/134,383

[22] Filed: Aug. 14, 1998

[51] Int. Cl.$^6$ ............... E03B 31/00; E03C 31/00; F17D 31/00
[52] U.S. Cl. .............. 137/625.47; 137/625.46; 137/625.22; 251/315.01
[58] Field of Search ............ 137/625.22, 625.24, 137/625.46, 625.47; 251/315.01, 315.16

[56] References Cited

U.S. PATENT DOCUMENTS

| | | |
|---|---|---|
| 3,684,241 | 8/1972 | Hartmann et al. .......... 251/315 |
| 4,441,524 | 4/1984 | Mese . |
| 4,685,488 | 8/1987 | Corbin et al. . |
| 4,809,949 | 3/1989 | Rakieski . |
| 4,915,133 | 4/1990 | Harrison ............... 137/625.47 |

FOREIGN PATENT DOCUMENTS

| | | |
|---|---|---|
| 40-34231 | 11/1965 | Japan . |
| 48-18824 | 3/1973 | Japan . |
| 48-65533 | 9/1973 | Japan . |
| 48-65532 | 10/1973 | Japan . |
| 62-34061 | 8/1987 | Japan . |
| 9-280390 | 10/1997 | Japan . |

*Primary Examiner*—Henry J. Recla
*Assistant Examiner*—Timothy L. Maust
*Attorney, Agent, or Firm*—Burns, Doane, Swecker & Mathis, L.L.P.

[57] ABSTRACT

In a vertical type three-way ball valve wherein a ball (2) fitted on a stem (8) is accommodated in a valve body (1) and a flow passage is switched by the rotation of the stem (8), the ball (2) has a first port (13), a second port (14) and a third port (15) oriented in the directions vertical to the axis of the stem (8), and a fourth port (16) oriented in the axial direction of the stem (8), wherein a flow passage formed between the first port (13) and the second port (14) and a flow passage formed between the third port (15) and the fourth port (16) are isolated from each other by a partition wall (17).

3 Claims, 9 Drawing Sheets

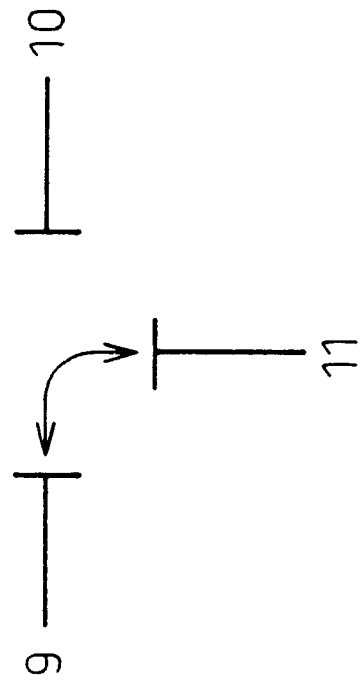
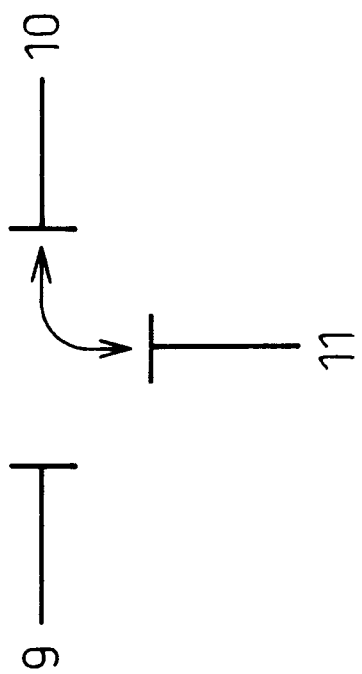

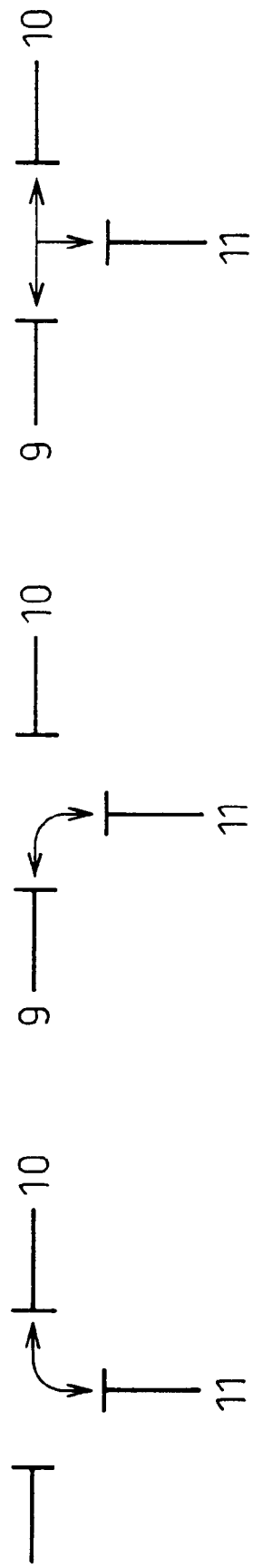

THREE-WAY BALL VALVE

BACKGROUND OF THE INVENTION (1) Field of the Invention

The present invention relates to a three-way ball valve used in a pipeline for various fluids, more specifically to a three-way ball valve of a vertical type having two independent flow passages within a ball and able to simplifying the piping.

(2) Description of the Related Art

Conventional vertical type three-way ball valves are mainly classified into a two-port type wherein two openings are provided in a ball arranged within a valve body and into a three-port type wherein three openings are provided in the ball. That is, in a ball valve structure shown in FIG. 7 wherein an inlet 11 is provided in the axial direction of a stem 8 fitted in a ball 18 and other inlets 9 and 10 are provided in the same plane as the former inlet at a right angle thereto on the opposite sides, the ball 18 of the two-port type accommodated within a main body 1 is shown in FIG. 8, having a port 20 oriented in the axial direction of the stem 8 and a port 19 oriented in a direction vertical to the axis of the port 20; and the ball 18 of the three-port type is shown in FIG. 9, having a port 21 and a port 22 corresponding to the ports 19 and 20 of the two-port type, respectively, and a further port 23 oriented in the direction vertical to the axis of the port 21.

However, in the two-port type, while a flow passage (FIG. 10a) communicating the inlet 10, the port 19, the port 20 and the inlet 11 with each other and a flow passage (FIG. 10b) communicating the inlet 9, the port 19, the port 20 and the inlet 11 with each other are formed by the rotation of the ball 18, it is impossible to form a flow passage communicating the inlet 9 with the inlet 10.

On the other hand, in the three-port type, it is possible to form not only a flow passage (FIG. 11a) communicating the inlet 10, the ports 21, 22 and the inlet 11 with each other and one (FIG. 11b) communicating the inlet 9, the ports 23, 22 and the inlet 11 with each other, but also a flow passage (FIG. 11c) wherein the ball 18 is located at a position of an intermediate opening degree so that both the former flow passages are communicated with each other. This, however, has a problem in that if one wishes to use a flow passage communicating the inlet 9 with the inlet 10 alone, the inlet 11 must be shut, which necessitates one more valve in a piping line on the inlet 11 side, resulting in a complication, of the piping.

SUMMARY OF THE INVENTION

The present invention has been made to solve the above-mentioned problems in the prior art, and an object thereof is to provide a three-way ball valve capable of forming a flow passage communicating the inlet 9 solely with the inlet 10 without providing an additional valve on the inlet 11 side.

According to the present invention, a three-way ball valve is provided, comprising a valve body having openings oriented in three directions, respectively; and a ball installed with a stem and having first to fourth ports, said ball being fitted in the interior of the valve body to be rotatable on the axis of the stem; said openings of the valve body being communicated with either one of the ports of said ball by the rotation of the stem; wherein the first port and the second port of the ball are arranged to be oriented in the direction vertical to the axis of the stem and to be communicated with each other, and the third port and the fourth port are arranged to be oriented in the direction vertical to the axis of the stem and in the axial direction thereof, respectively, and to be communicated with each other, and wherein a flow passage communicating the first port with the second port and a flow passage communicating the third port with the fourth port are isolated from each other by a partition wall.

In the three-way ball valve according to the present invention, the first port and the third port are oriented at right angles relative to each other, and the third port and the second port are oriented at right angles relative to each other.

According to the present invention, it is possible to pass a fluid in the horizontal direction or L-shaped directions with only one ball valve, by providing two independent flow passages in the ball.

In this regard, the material for the ball valve according to the present invention is not limited but may include metal, plastic or others used in the prior art.

In a preferred embodiment of the present invention, an engagement groove is provided on a top of the ball to be engaged with the stem, and the first and second ports are oriented in the same direction as the engagement groove, the third port is oriented in the direction vertical to the engagement groove, and the fourth port is provided in the bottom wall of the ball opposed to the engagement groove.

BRIEF DESCRIPTION OF THE DRAWINGS

FIGS. 10a and 10b are schematic views of the switching of flow passage in the two-port type three-way ball valve;

FIGS. 11a, 11b and 11c are schematic views of the switching of flow passage in the three-port type three-way ball valve.

DESCRIPTION OF THE PREFERRED EMBODIMENTS

The preferred embodiments of the present invention will be described below with reference to the drawings, but it should be noted that the present invention should not be limited thereto.

Figure 1:
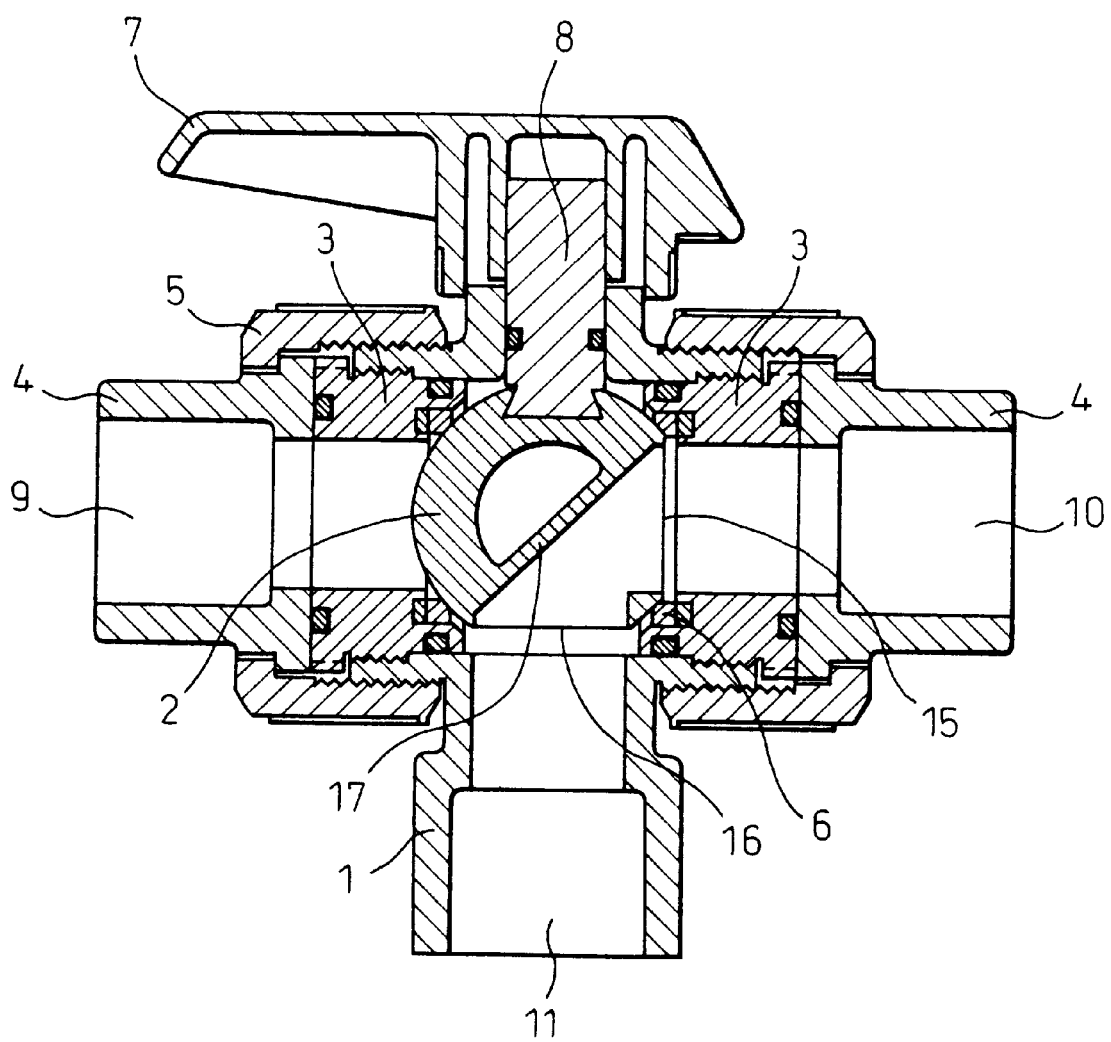
FIG. 1 is a side sectional view of one embodiment of a ball valve according to the present invention.

FIG. 1 is a side sectional view of one embodiment of a ball valve according to the present invention, made of plastic such as polyvinylchloride resin. In FIG. 1, a valve body 1 has openings oriented in T-shape directions. A ball 2 is accommodated in the valve body 1 and fitted on a stem 8 which is fitted at an upper end with a handle 7, while being retained by seats 6 of unions 3 screwed with the valve body 1 from opposite sides thereof. A body cap 4 is held by a cap nut 5 and secured to the respective union 3 via an O-ring by screwing the cap nut 5 with the valve body 1.

In the above-mentioned overall structure, inlets 9 and 10 are formed on opposite sides of the valve body 1 by the union 3 and the body cap 4, and another inlet 11 is formed on the extension of the axis of the stem 8 of the valve body 1.

In this regard, while the inlets 9, 10 and 11 may become "entrances" or "exits" in accordance with the flow direction of fluid to be treated in this embodiment, they will be represented always as "inlet" to simplify the description.

The ball 2 will be described in more detail below.

Figure 2:
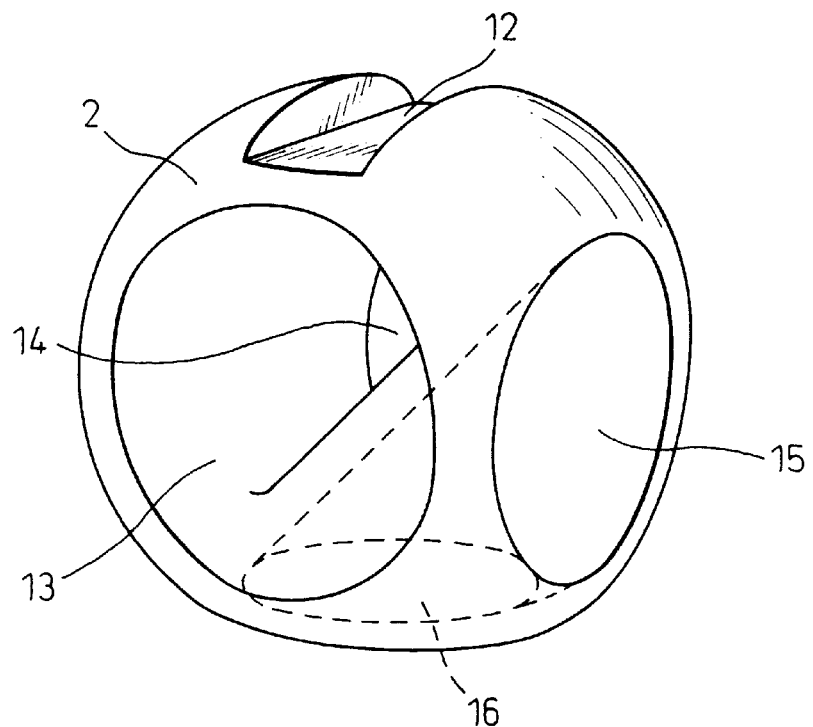
FIG. 2 is a perspective view of a ball according to the present invention.
Figure 3:
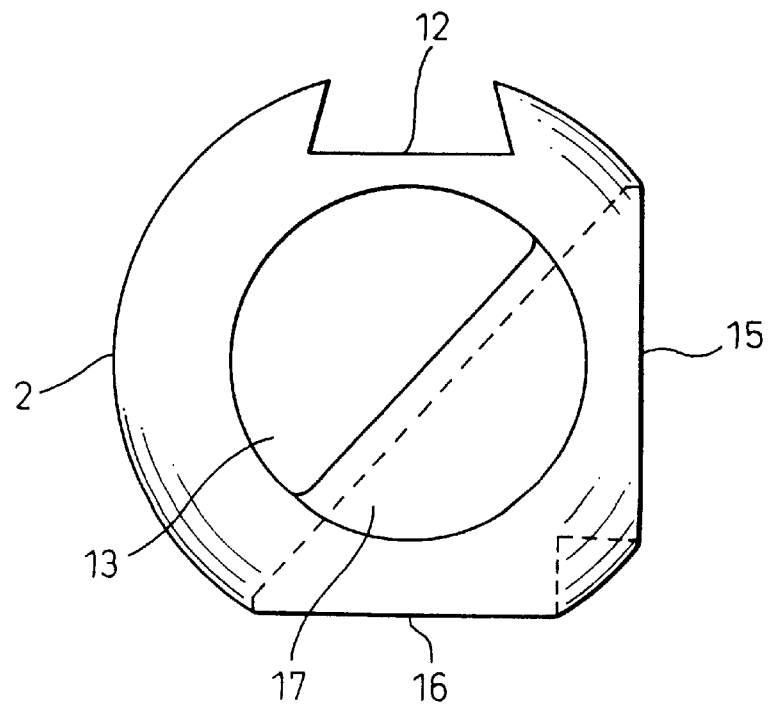
FIG. 3 is a front view of the ball shown in FIG. 2.
Figure 4:
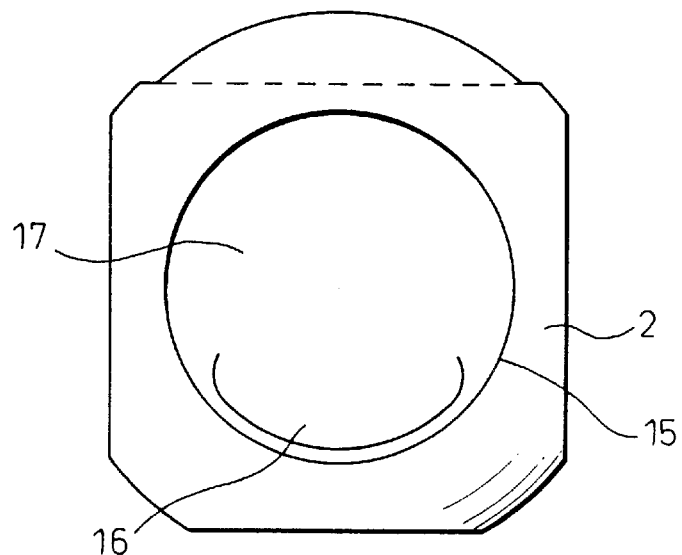
FIG. 4 is a righthand side view of the ball shown in FIG. 2.

FIG. 2 is a perspective view of the ball 2, FIG. 3 is a front view thereof, and FIG. 4 is a righthand side view thereof. With reference to FIGS. 2 to 4, a engagement groove 12 is provided for the engagement with the stem 8 secured to a top of the ball 2. Three ports 13, 14 and 15 are provided while being oriented in the directions vertical to the axis of the stem 8, wherein the first port 13 and the third port 15 are arranged at a right angle between the both, and the third port 15 and the second port 14 are arranged at a right angle between the both. That is, the first and second ports 13, 14 are oriented in the same direction as the engagement groove 12, and the third port 15 is oriented in the direction vertical to the engagement groove 12. In addition, a fourth port 16 is provided in a bottom wall of the ball opposed to the engagement groove 12 while being oriented in the axial direction of the stem 8. A partition wall 17 is provided in the ball 2 to isolate a flow passage communicating the first port 13 with the second port 14 from a flow passage communicating the third port 15 with the fourth port 16 so that both the flow passages are independent from each other.

Figure 5:
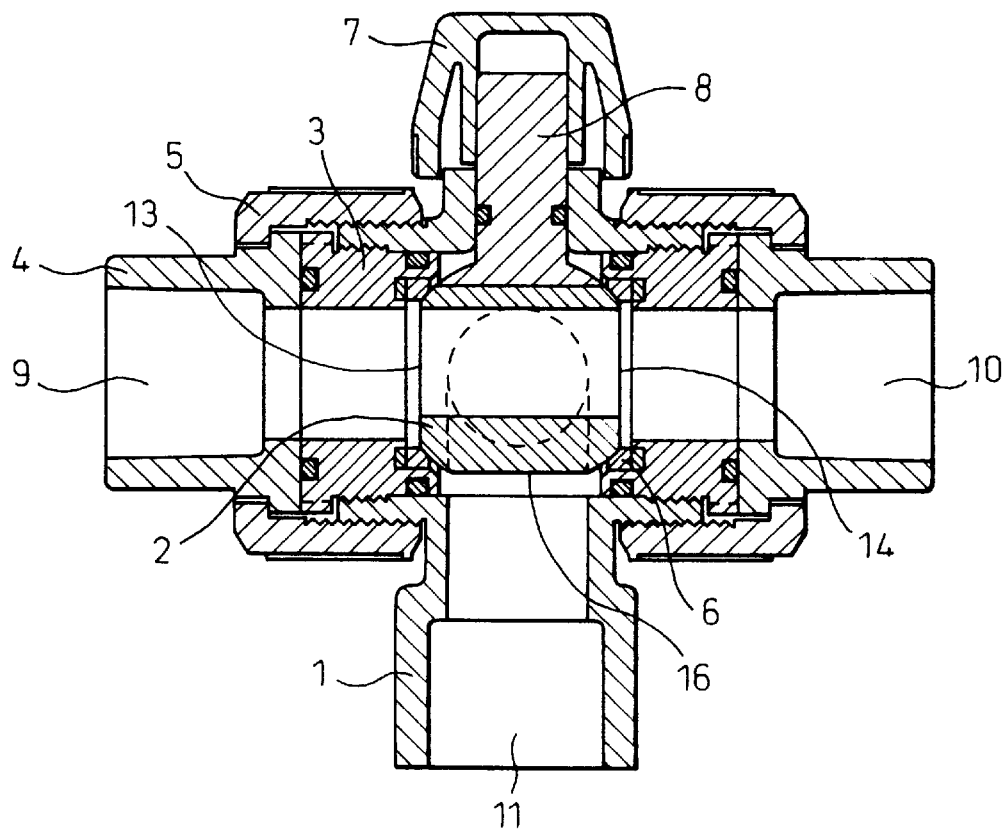
FIG. 5 is a side sectional view of the ball valve when a handle is rotated by 90 degrees counterclockwise from a state shown in FIG. 1.
Figure 6:
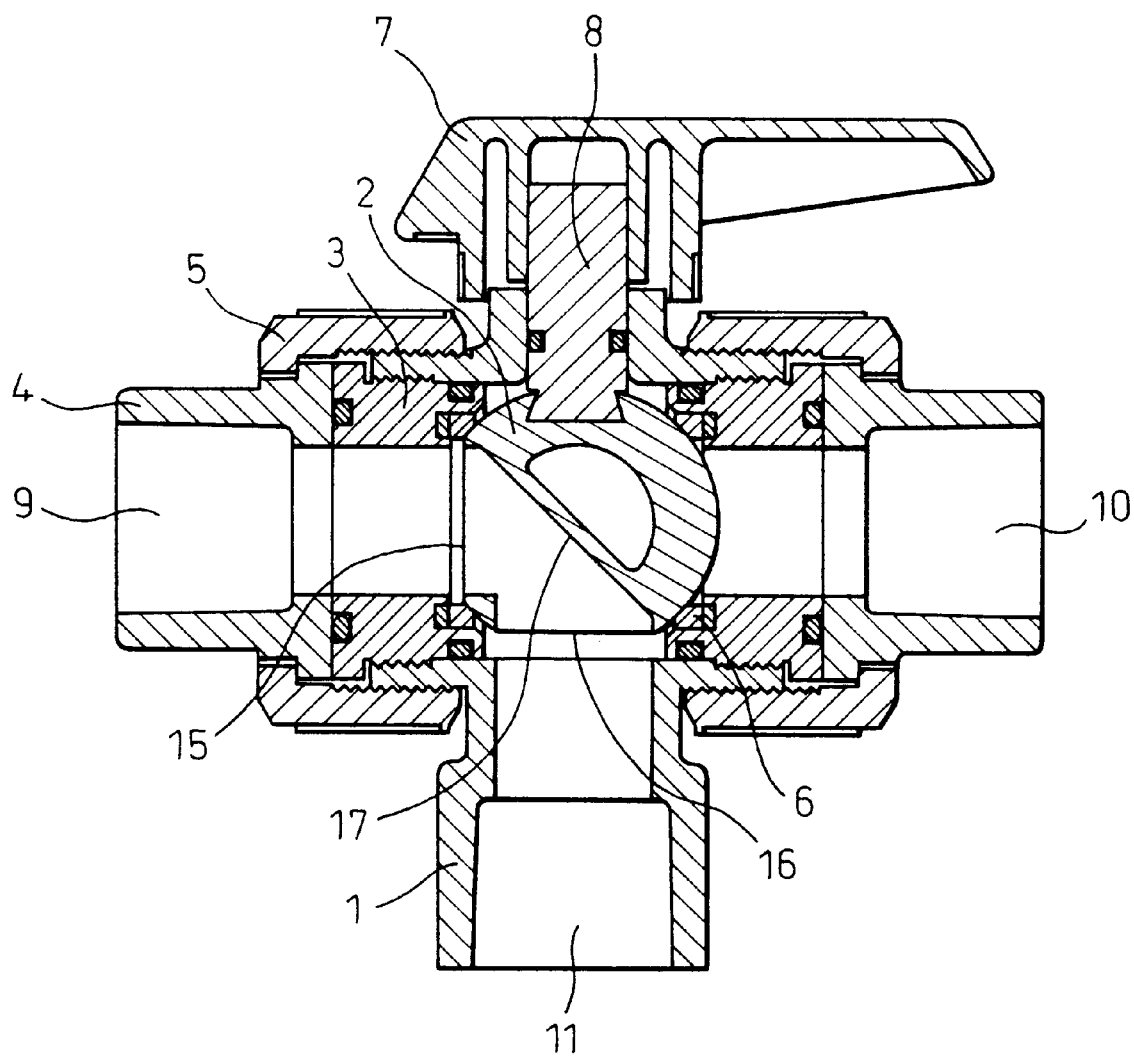
FIG. 6 is a side sectional view of the ball valve when a handle is rotated by 90 degrees counterclockwise from a state shown in FIG. 5.
Figure 7:
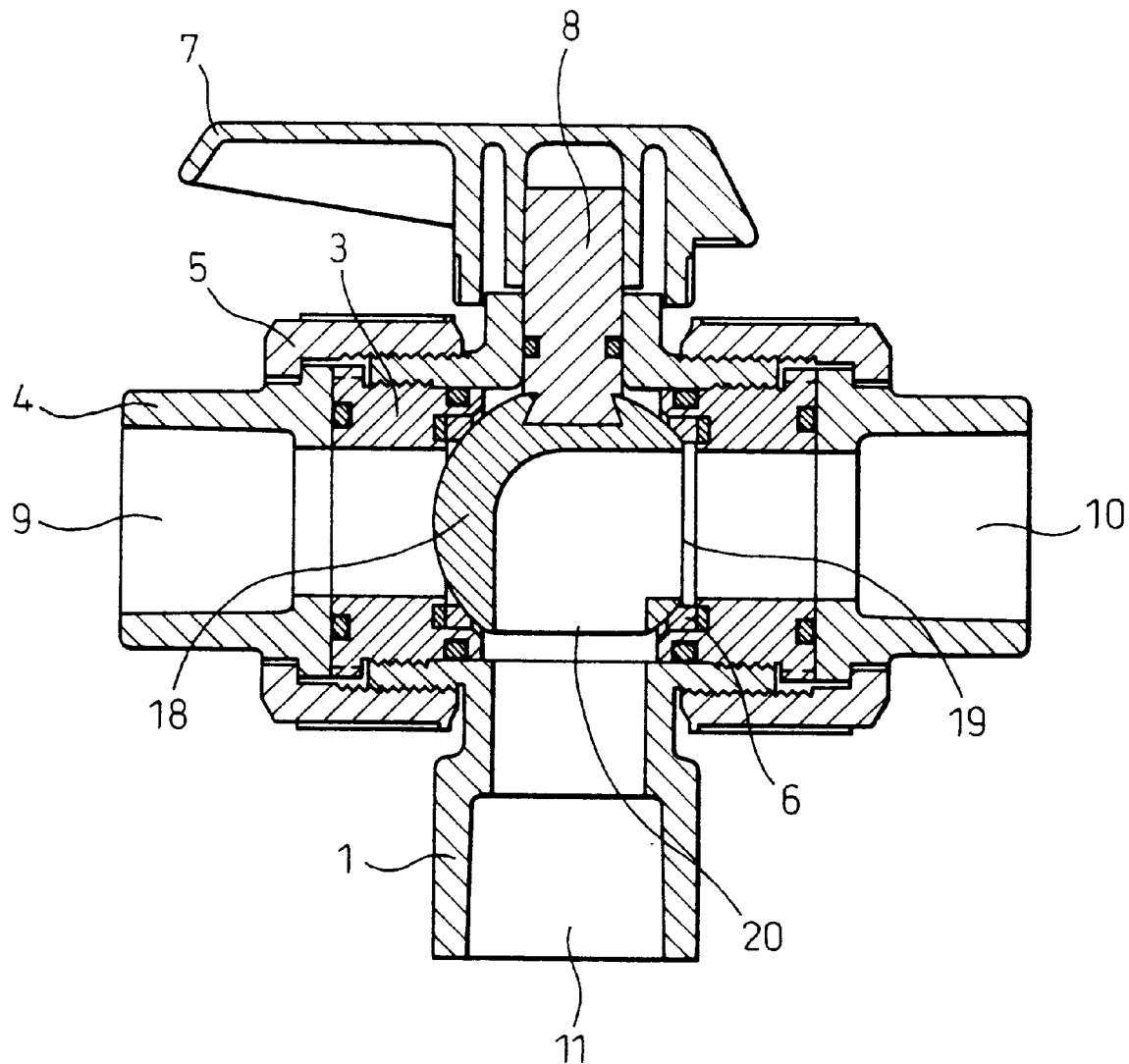
FIG. 7 is a side sectional view of a prior art three-way ball valve of a two-port type.
Figure 8:
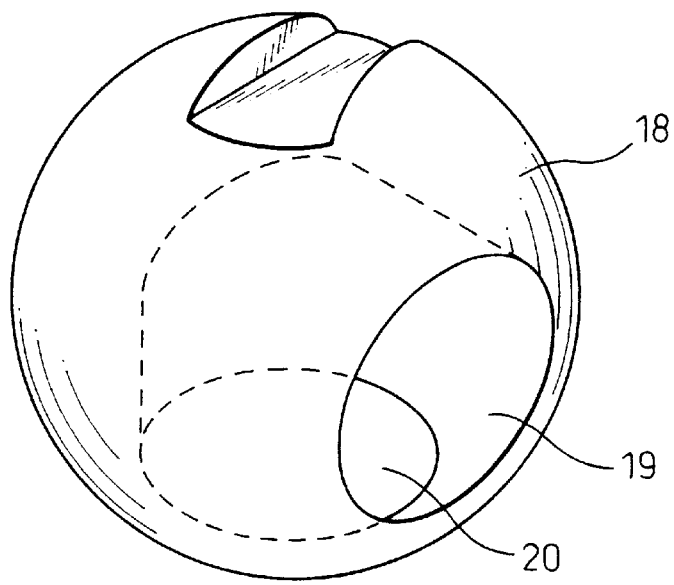
FIG. 8 is a perspective view of the ball in FIG. 7.
Figure 9:
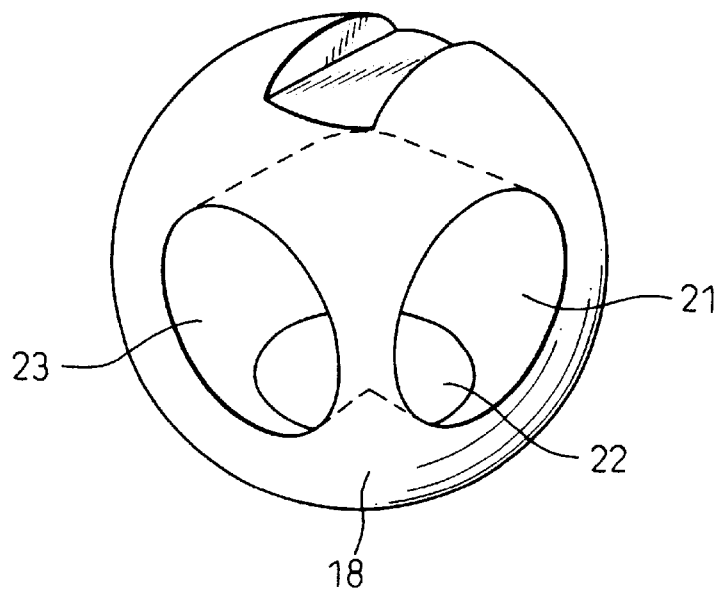
FIG. 9 is a perspective view of a ball used in a prior art three-way ball valve of a three-port type.

Next, the operation of the three-way ball valve of this embodiment will be described with reference to FIGS. 5 and 6. In FIG. 1, the inlets 10 and 11 are communicated with each other by the third and fourth ports 15, 16 of the ball 2, and an L-shaped flow passage is formed between the inlet 10 and the inlet 11 via the ball 2. If the handle 7 rotates counterclockwise by 90 degrees from this state, another state shown in FIG. 5 is present. In the latter state, the inlet 9 and the inlet 10 are communicated with each other via the first port 13 and the second port 14 of the ball 2, and a flow passage is formed in the direction from the inlet 9 to the inlet 10, i.e., in the horizontal direction. On the other hand, the third port 15 (indicated by a circle of a dotted line) of the ball 2 is closed to shut the inlet 11. If the handle further rotates counterclockwise by 90 degrees from this state, a further state shown in FIG. 6 is present. In the latter state, the inlet 9 and the inlet 11 are communicated with each other via the third port 15 and the fourth port 16 of the ball 2, and an L-shaped flow passage in the reverse phase to the above-mentioned L-shaped flow passage is formed in the direction from the inlet 9 to the inlet 11 via the ball 2.

In this regard, if the handle 7 rotates in the reverse direction (clockwise) from the state shown in FIG. 6, the state shown in FIG. 5 is present and further the state shown in FIG. 1 is present.

As described above, since two independent flow passages are formed in the ball, it is possible to pass various fluids in a horizontal flow passage communicating the inlets 9 and 10 with each other or any one of two L-shaped flow passages communicating the inlets 9 and 10 with the inlet 11, respectively.

An application of a three-way ball valve according to the present invention will be described based on FIG. 12.

Figure 12:
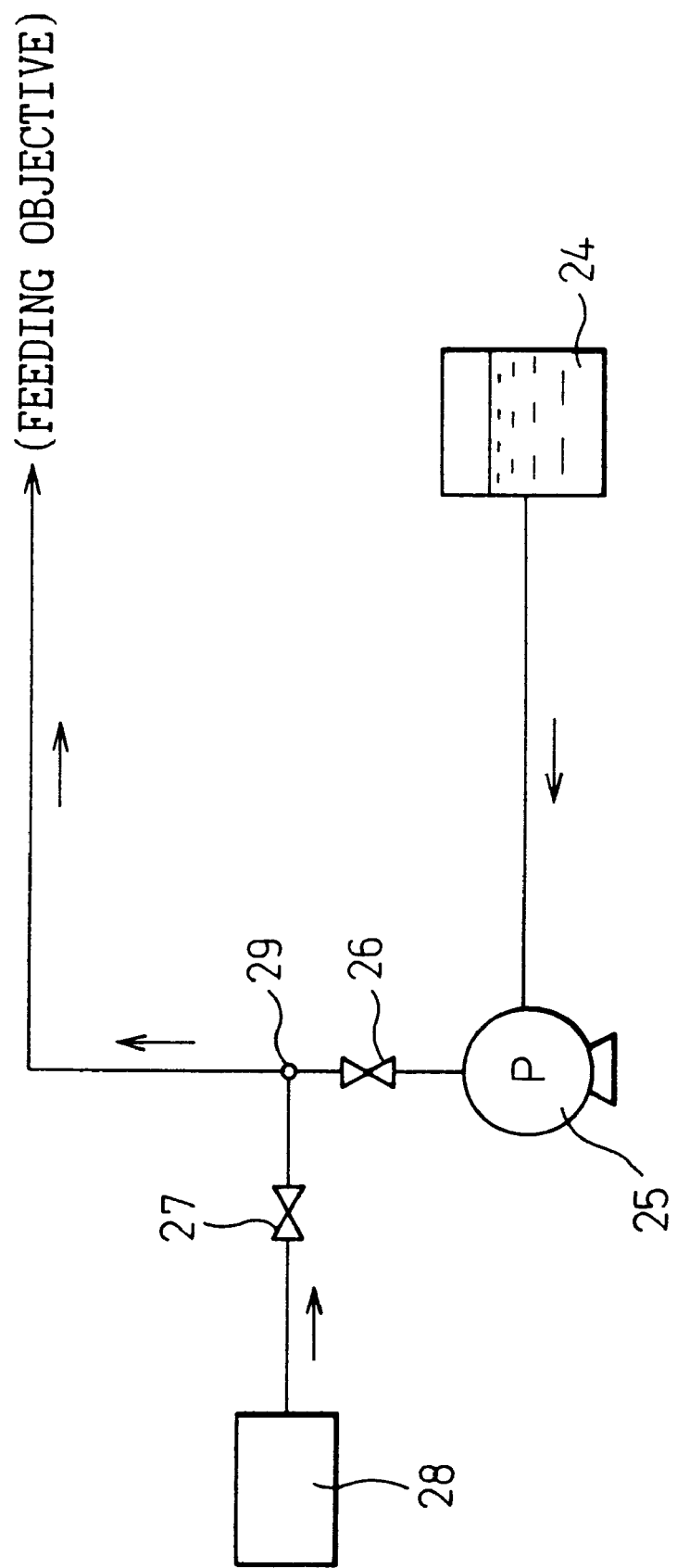
FIG. 12 is a schematic view of a prior art piping line.

FIG. 12 is a schematic view of a piping line for supplying fluid such as a liquid agent or a liquid fertilizer.

When the fluid in a reserve tank 24 is fed, a pump 25 is operated while a valve 26 is in an open state and a valve 27 is in a closed state. For example, if the cleaning of the piping is required because of the deposition of crystals or sludge in the piping downstream of the valve 26, cleaning water is supplied from a water source 28 while the valve 26 is in a close state and the valve 27 is in an open state. In the prior art, the valve-switching operation described above is necessary when the fluid is supplied or cleaning is being carried out.

On the contrary, if the three-way ball valve according to the present invention is provided at a branch point 29 of this piping line, the provision of further valve becomes unnecessary, whereby there are advantages in that the switching of fluids to be fed is carried out only by rotating the handle at a right angle, the complicated piping is eliminated, and the operation is simplified.

As is apparent from the above description, according to a three-way ball valve of the present invention, a horizontal transportation of fluid becomes possible which is impossible in a prior art two-port type ball valve, and the provision of further valve is unnecessary for shutting the fluid flow, which is necessary in a prior art three-port type ball valve. That is, since it is possible to feed fluid in three directions with only one ball valve, there is an excellent effect in that it is widely usable in a fluid pipe-line.

I claim:

1. A three-way ball valve comprising a valve body having openings oriented in three directions, respectively; and a ball installed with a stem and having first to fourth ports, said ball being fitted in the interior of the valve body to be rotatable on the axis of the stem; said openings of the valve body are communicated with either one of the ports of the ball by the rotation of the stem; wherein the first port and the second port of the ball are arranged to be oriented in the direction transverse to the longitudinal of the stem and arranged to be communicated with each other, and the third port and the fourth port are arranged to be oriented in the direction transverse to the longitudinal of the stem and in the axial direction thereof, respectively, and to be communicated with each other, and wherein a flow passage communicating the first port with the second port and a flow passage communicating the third port with the fourth port are isolated from each other by a partition wall.

2. A three-way ball valve as defined by claim 1, wherein the first port and the third port are oriented at a right angle relative to each other, and the third port and the second port are oriented at a right angle relative to each other.

3. A three-way ball valve as defined by claim 1, wherein an engagement groove is provided on a top of the ball to be engaged with the stem, and the first and second ports are oriented in the same direction as the engagement groove, the third port is oriented in the direction transverse to the engagement groove, and the fourth port is provided in the bottom wall of the ball opposed to the engagement groove.

* * * * *